United States Patent
Horvat et al.

(10) Patent No.: US 8,320,436 B2
(45) Date of Patent: *Nov. 27, 2012

(54) CALIBRATING RECEIVED SIGNAL MEASUREMENTS IN A COMMUNICATION DEVICE

(75) Inventors: Michael Horvat, Munich (DE); Bernd Heise, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,060

(22) Filed: Dec. 19, 2011

(65) Prior Publication Data

US 2012/0087404 A1    Apr. 12, 2012

Related U.S. Application Data

(63) Continuation of application No. 11/937,840, filed on Nov. 9, 2007, now Pat. No. 8,102,903.

(51) Int. Cl.
*H04B 3/46* (2006.01)

(52) U.S. Cl. ......... 375/224; 375/316; 375/219; 375/220

(58) Field of Classification Search ................... 375/224, 375/316, 219, 220
See application file for complete search history.

(56) References Cited

U.S. PATENT DOCUMENTS

| | | | |
|---|---|---|---|
| 8,102,903 B2* | 1/2012 | Horvat et al. | 375/224 |
| 2002/0191638 A1* | 12/2002 | Wang et al. | 370/465 |
| 2003/0063711 A1* | 4/2003 | Ginesi et al. | 379/1.01 |
| 2003/0149991 A1* | 8/2003 | Reidhead et al. | 725/119 |

* cited by examiner

*Primary Examiner* — Shuwang Liu
*Assistant Examiner* — Michael Neff
(74) *Attorney, Agent, or Firm* — Ignacio Asperas

(57) ABSTRACT

Received signal measurements are calibrated in a communication device by measuring a received signal level for each of one or more subcarriers of a transmitted signal received from another communication device, converting the measured received signal level for each of the one or more subcarriers into a corresponding measured power level, estimating a terminal-to-terminal impedance between the communication devices and calculating a corrected power level for each of the one or more subcarriers as a function of the measured power level for the subcarrier, a known reference input impedance for the communication device and the estimated terminal-to-terminal impedance.

21 Claims, 6 Drawing Sheets

CALIBRATING RECEIVED SIGNAL MEASUREMENTS IN A COMMUNICATION DEVICE

PRIORITY CLAIM

This application is a continuation of U.S. application Ser. No. 11/937,840 filed on 9 Nov. 2007, the content of said application incorporated herein by reference in its entirety.

BACKGROUND

The present invention generally relates to digital communications and particularly relates to calibrating received signal measurements in a digital subscriber line device.

Digital Subscriber Line (DSL) systems use existing twisted-pair telephone lines to transport high-bandwidth data to subscribers. A number of forms of DSL technology have been developed, including Asymmetric DSL (ADSL), Symmetric DSL (SDSL), High bit-rate DSL (HDSL), and Very-high data-rate DSL (VDSL). Standardization efforts related to DSL are continuing, under the auspices of such groups as the Telecommunication Standardization Sector of the International Telecommunication Union (ITU-T).

Several versions of DSL, including ADSL2 and VDSL2, employ a line-coding method known as discrete multi-tone (DMT). In a DMT-based DSL system, the available transmission bandwidth is divided into a large number (e.g., 256) of separate sub-bands, each with a bandwidth of 4 kHz. Subcarriers corresponding to each of those sub-bands may be individually and independently modulated with data. Thus, one of several modulation schemes, ranging from Quadrature Phase-Shift Keying (QPSK) to 64-level Quadrature Amplitude Modulation (QAM-64), may be independently selected for each sub-carrier. A key advantage of DMT is that adaptive equalization is generally not required, since noise and interference characteristics do not vary substantially across a single 4-kHz sub-band. Instead, DMT-based DSL systems adapt to frequency-dependent noise, loss, and interference conditions by varying the modulation and/or coding on each individual sub-carrier. Thus, one sub-carrier may be modulated at a very high data rate, another at a lower data rate, while yet another may not be used at all.

DSL standards such as ADSL2 and VDSL2 specify that information regarding noise and loss conditions is reported by subscriber modems to the DSL management plane at initialization. (Initialization may occur at installation as well as after subsequent re-starts of the customer premises equipment). In particular, a logarithmic representation of the frequency-dependent loop transfer function (HLOG-ps), as well as a representation of the frequency-dependent quiet line noise (QLN-ps), are transmitted by the customer premises equipment to the remote modem during initialization. These reports essentially comprise vectors of values, wherein each element of the vectors corresponds to a sub-carrier/sub-band. The loop transfer function, HLOG-ps, equals the difference between the transmitted power spectral density (PSD)—the frequency-dependent distribution of the power transmitted by the remote modem—and the received PSD—the frequency-dependent distribution of the power actually received at the customer premises equipment (CPE). In other words, HLOG-ps represents the frequency-dependent loss experienced by the DSL signal as it propagates from the remote modem to the CPE modem. Thus, HLOG-ps data is collected while the remote modem is transmitting signals; calculating HLOG-ps requires knowing the transmitted power level. In contrast, QLN-ps represents the received PSD when no signal is transmitted by the far-end modem, i.e., the so-called QUIET state. These values are used by the remote modem in determining how to assign data and modulation schemes to the subcarriers.

To determine either HLOG-ps or QLN-ps, the receiver must measure, or estimate, the received PSD. Typically, the received PSD is estimated from frequency-selective voltage measurements made at the CPE modem. However, several problems limit the accuracy of those estimates and/or the usefulness of the resulting reports. First, the relationship between the voltage measurements and received power depends upon the input impedance of the CPE modem. This input impedance may vary from model to model, or from vendor to vendor. Furthermore, the voltage measurements may be performed by an application-specific integrated circuit (ASIC) supplied and/or programmed by one party, while the analog front-end circuitry (the design of which largely determines the input impedance) is supplied by another. Thus, the ASIC, which typically must calculate the PSD estimates, is typically unaware of the actual input impedance of the DSL device. Second, the voltage measurements depend not only on the transmitted power level and the nominal loss of the subscriber loop, but also on the relationship between the actual line impedance of the subscriber to the input impedance of the CPE modem.

Vendors typically sidestep these problems by simply programming their modems to measure the received voltage magnitude and divide the voltage measurements by a fixed factor that leads to reasonable results in a simple lab scenario. However, these proprietary approximation approaches lead to large variations of HLOG-ps and QLN-ps reports among different chipsets under real-world conditions.

SUMMARY

According to an embodiment of a method of calibrating received signal measurements in a communication device, the method comprises: measuring a received signal level for each of one or more subcarriers of a transmitted signal received from another communication device; converting the measured received signal level for each of the one or more subcarriers into a corresponding measured power level; estimating a terminal-to-terminal impedance between the communication devices; and calculating a corrected power level for each of the one or more subcarriers as a function of the measured power level for the subcarrier, a known reference input impedance for the communication device and the estimated terminal-to-terminal impedance.

According to an embodiment of a communication device, the device comprises one or more circuits operable to: measure a received signal level for each of one or more subcarriers of a transmitted signal generated by another communication device; convert the measured received signal level for each of the one or more subcarriers into a corresponding measured power level; estimate a terminal-to-terminal impedance between the communication devices; and calculate a corrected power level for each of the one or more subcarriers as a function of the measured power level, a known reference input impedance for the communication device and the estimated terminal-to-terminal impedance.

According to an embodiment of a DSL communication device, the DSL device comprises one or more circuits operable to: measure a received signal level for each of one or more subcarriers of a transmitted DSL signal generated by another DSL communication device; convert the measured received signal level for each of the one or more subcarriers into a corresponding measured power level; estimate a loop impedance between the DSL communication devices; and calculate a corrected power level for each of the one or more subcarriers as a function of the measured power level, a known reference input impedance for the DSL communication device and the estimated loop impedance.

Of course, the present invention is not limited to the above features and advantages. Those skilled in the art will recognize additional features and advantages upon reading the following detailed description, and upon viewing the accompanying drawings.

DETAILED DESCRIPTION

The present invention will be described below in view of the several drawings attached. Although the inventive methods and apparatus discussed herein may be applied at either end of a Digital Subscriber Line (DSL) loop, the invention is explained with respect to a customer premises equipment (CPE) modem in the discussion that follows. Those skilled in the art will recognize modifications, if any, necessary to apply the inventive techniques to a central office modem.

Figure 1:
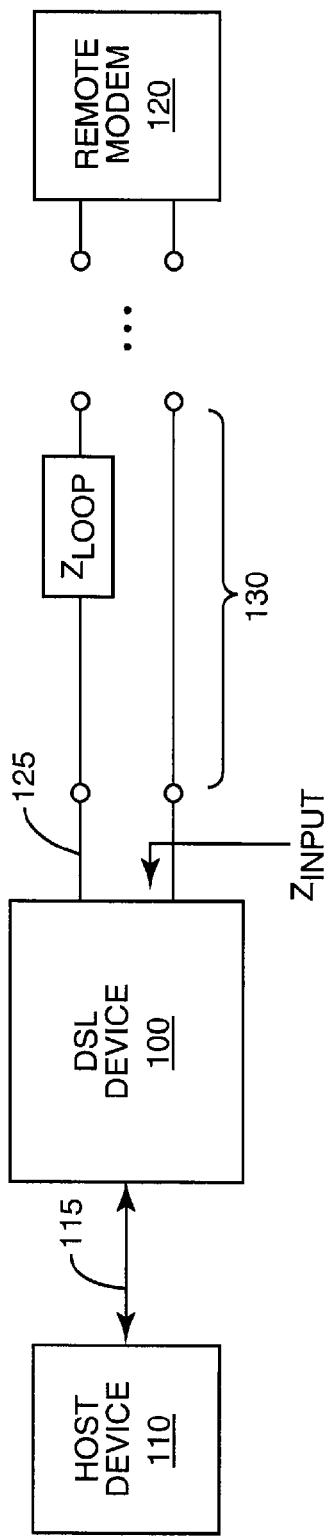
FIG. 1 is a block diagram of a DSL system in accordance with one or more embodiments of the invention.

FIG. 1 illustrates a DSL system comprising a DSL device 100 connected to a host 110, via interface 115. Host 110 may be any of a variety of computing devices, including, but not limited to, a personal computer, a server, a wireless access point and/or router, or the like. DSL device is further connected to remote modem (remote DSL transceiver unit) 120, via phone line 130. In at least one embodiment, DSL device 100 is configured to operate as a CPE modem, while remote modem 120 operates as a Central Office (CO) modem. In one or more embodiments, DSL device 100 comprises an Asymmetric DSL (ADSL) modem using discrete multi-tone (DMT) signals. In other embodiments, DSL device 100 may be implemented as a Very-high data rate DSL (VDSL) modem, or according to any of a number of DSL specifications.

Phone line (subscriber loop) 130 has a characteristic impedance $Z_{LOOP}$, as viewed from the DSL device 100. Typically, $Z_{LOOP}$ is a complex value comprising a real part of 100 to 120 ohms and an imaginary part of 0 to -20 ohms, but loop impedances in the field will often vary beyond these ranges. DSL device 100 is connected to phone line 130 via electrical interface 125, and has an input impedance $Z_{INPUT}$ (viewed from the subscriber loop). Optimally, $Z_{INPUT}$ is "matched" to $Z_{LOOP}$, i.e., $Z_{INPUT}$ is the complex conjugate of $Z_{LOOP}$, but in practice this match is only approximate.

As noted above, DSL device 100 performs power spectral density (PSD) measurements in order to report loop transfer function and quiet line noise information to the management plane of the DSL system. These measurements, which are typically based on voltage measurements, depend on the values of $Z_{LOOP}$ and $Z_{INPUT}$. This relationship is explained with reference to FIG. 2.

Figure 2A:
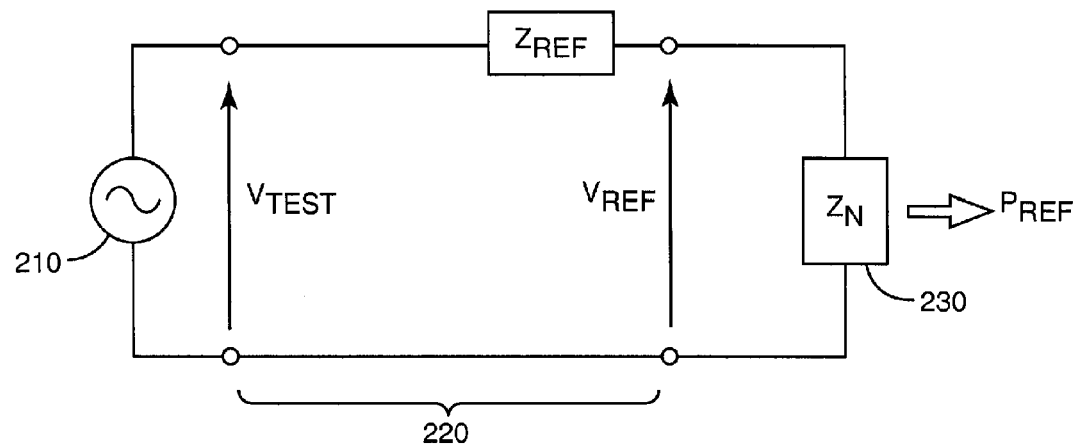
FIGS. 2A and 2B are schematic diagrams illustrating the measurement of power spectral density in a DSL system.

FIG. 2A illustrates a test generator 210 supplying signals to a reference load 230 over a test loop 220. The test loop 220 has a characteristic impedance of $Z_{REF}$, while the reference load 230 has an impedance of $Z_N$; each of these values may be complex and frequency dependent. If generator 210 supplies an input signal at a given frequency with a voltage of $V_{TEST}$, so that the voltage $V_{TEST}$ is present at reference load 230, then the power received at the reference load is: $P_{REF} = V^2_{REF}/Z_N$. Those skilled in the art will appreciate that the actual value of $V_{REF}$ will depend on $V_{TEST}$, $Z_{REF}$, and the transfer function (i.e., loss) of transmission line 220.

Figure 2B:
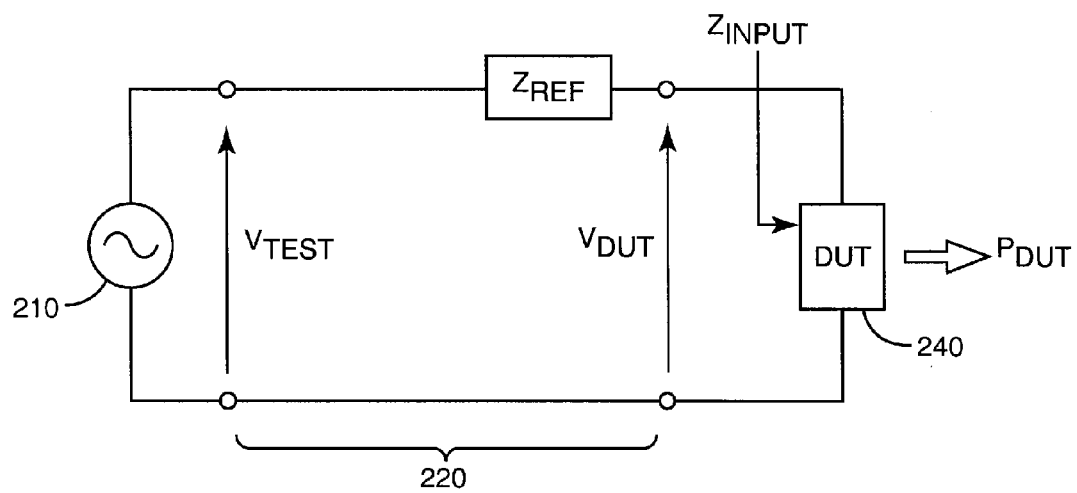

In FIG. 2B, the reference load 230 is replaced with a device under test (DUT) 240, with a load impedance of $Z_{INPUT}$. DUT 240 represents the unknown and potentially varying input impedances exhibited by various DSL devices 100. Given that generator 210 supplies the same input signal, with a voltage of $V_{TEST}$, a voltage $V_{DUT}$ will be observed at DUT 240. The actual voltage observed will vary, depending on $Z_{INPUT}$. The power absorbed (received) by DUT 240 is thus $P_{DUT} = V^2_{DUT}/Z_{INPUT}$.

Especially if $Z_N$ is chosen to match $Z_{REF}$, the measured power $P_{REF}$ of FIG. 2A is preferred to the measured $P_{DUT}$ of FIG. 2B, for purposes of determining the transfer function of test loop 220. Even if $Z_N$ does not precisely match $Z_{REF}$, power measurements referenced to a constant, known $Z_N$ will yield consistent transfer function and quiet line noise reports. In contrast, power spectral densities referenced even to a known, but variable $Z_{INPUT}$ will result in reporting errors. In fact, it can be shown that if $P_{DUT}$ is used for the received PSD in calculating HLOG-ps, then the error in the reported HLOG-ps (in dB) will be:

$$Error_{dB} = 10 \cdot \log\left(\frac{PSD_N}{PSD_{DUT}}\right) = 10 \cdot \log\left(\left|\frac{Z_N}{Z_{INPUT}}\right| \cdot \frac{|Z_{INPUT} + Z_{REF}|^2}{|Z_N + Z_{REF}|^2}\right). \quad (1)$$

Normalizing power spectral density measurements to a constant, known value for $Z_N$ will eliminate some or all of this error. (Residual error remains to the extent that loop impedance $Z_{LOOP}$ differs from the test loop impedance $Z_{REF}$, as will be discussed further below.) Given that the value of $Z_{INPUT}$ is known to the DSL device 100, PSD measurements may be normalized to a reference impedance $Z_N$ according to the formula:

$$PSD_{REF} = PSD_{DUT} \cdot \frac{Z_N}{Z_{INPUT}} \frac{|Z_{REF} + Z_{INPUT}|^2}{|Z_{REF} + Z_N|^2}. \quad (2)$$

In a laboratory environment, $Z_{REF}$, the characteristic impedance of the test loop 220, is either known or can be measured. $Z_{INPUT}$, the modem input, is either known by design, or may be determined by testing. $Z_N$ is the known value of a reference load. Thus, all the necessary information is available to convert DUT-specific PSD measurements to PSD measurements referenced to a known load. Accordingly, consistent reporting between various modems having different input impedances may be achieved.

In the field, the actual characteristic impedance of the subscriber loop may not be known. However, normalizing PSD measurements according to Equation (2) will often yield satisfactory results, especially if the characteristic impedances of subscriber loops vary over a small range. Thus, in various embodiments of the present invention, PSD measurements are normalized, i.e. calibrated, with respect to a known reference input impedance level, to provide improved loop transfer function and quiet line noise reporting in a DSL system.

Figure 3:
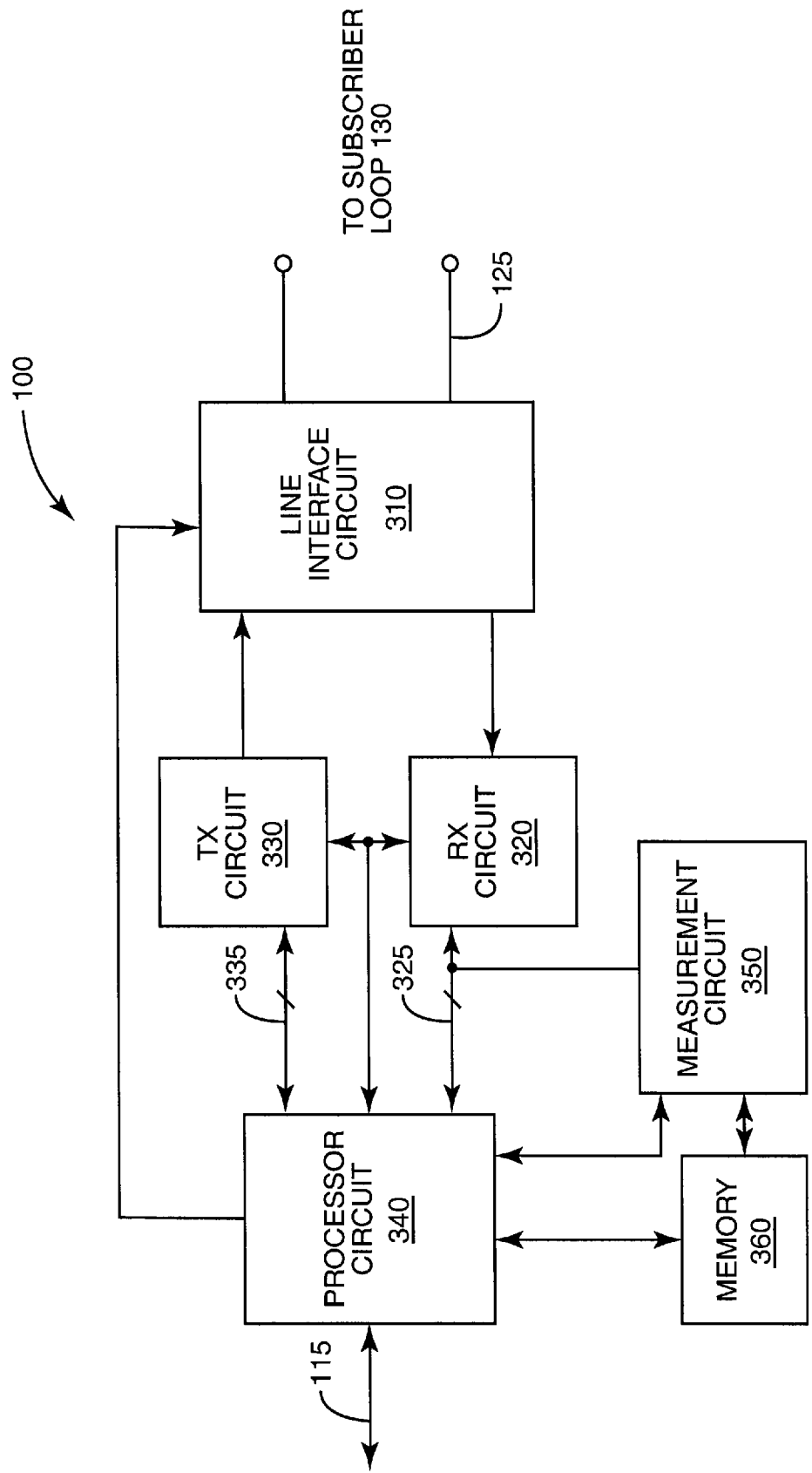
FIG. 3 is a block diagram of one embodiment of a DSL device.

One embodiment of a DSL device 100 is pictured in FIG. 3. DSL device 100 comprises a line interface circuit 310, which presents line interface 125 to the subscriber loop. Line interface circuit 310 generally provides for multiplexing and demultiplexing between the subscriber loop and receive circuit 320 and transmit circuit 330. Line interface circuit 310 may in some embodiments provide echo cancellation, under the control of processor circuit 340. Receive circuit 320 and transmit circuit 330, which generally provide for conversion between the analog and digital domains, are controlled by processor circuit 340, which also provides interface 115 to the host device 110 for communication between the host device 110 and DSL device 100. Processor circuit 340 receives incoming data from receive circuit 320 via interface 325 and sends outgoing data to the transmit circuit 330 via interface 335.

Processor circuit communicates with memory 360 via an address/data bus, and may comprise, in various embodiments, a commercially available standard or custom microprocessor, microcontroller, digital-signal processor (DSP), and/or application-specific integrated circuit. Memory 360 is representative of one or more memory devices containing the software and data used to operate the DSL device 100, including software and data for performing the methods for calibrating received signal measurements described herein. Memory 360 may include, but is not limited to, the following types of devices: ROM, PROM, EPROM, EEPROM, flash, SRAM, and DRAM.

DSL device 100 further comprises measurement circuit 350, which is configured to perform measurements of one or more parameters of signals received from the subscriber loop 130. In the embodiment pictured in FIG. 3, measurement circuit 350 is configured to perform measurements using digital data at interface 325, under the control of processor circuit 340, but other configurations are possible. In one or more embodiments, measurement circuit 350 is configured to perform Fast Fourier Transform (FFT) operations, using incoming received signal data, to obtain received signal level information for each of one or more subcarriers of the incoming DSL signal. Those skilled in the art will appreciate that measurement circuit may be implemented with a separate circuit from processor circuit 340, or may be implemented with the same circuitry as processor circuit 340.

Figure 4:
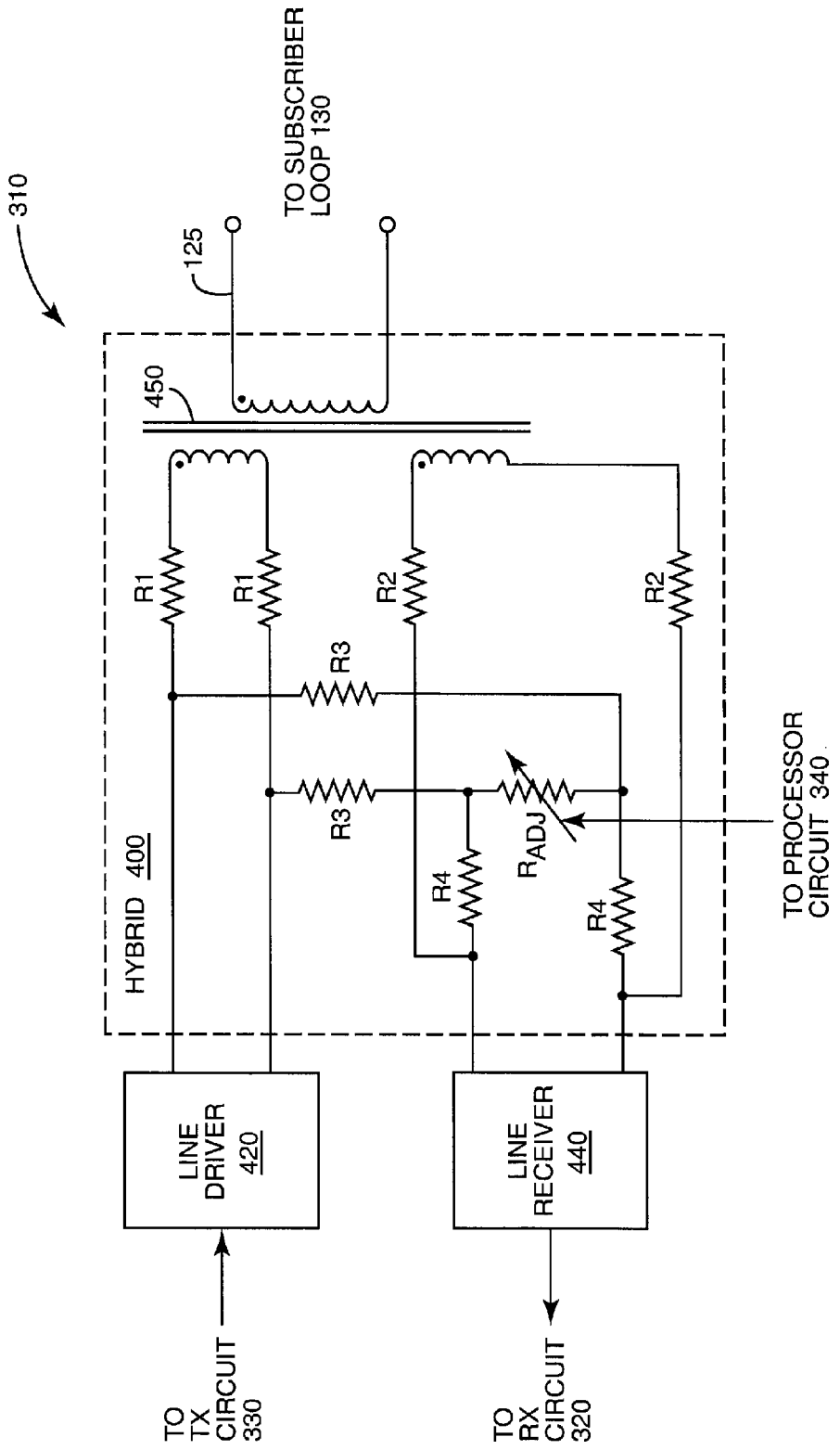
FIG. 4 illustrates a line interface circuit.

An exemplary line interface circuit 310 is pictured in FIG. 4, and comprises an echo-cancelling hybrid circuit 400, a line driver circuit 420, and a line receiver circuit 440. Line driver circuit 420 generally buffers and amplifiers signals produced by transmit circuit 330 and couples the amplified signal to hybrid circuit 400. Line receiver circuit 440 buffers and amplifies signals from hybrid circuit 400 and couples the amplified signals to receive circuit 320. Hybrid circuit 400 couples transmit and receive signals to and from the subscriber loop 130, via loop interface 125.

Hybrid circuit 400 includes transformer 450 as well as coupling resistors R1, R2, R3, and R4. An adjustable resistor $R_{ADJ}$ allows for cancellation of all or part of echoes caused by a mismatch between the subscriber loop impedance $Z_{LOOP}$ and the input impedance $Z_{INPUT}$ presented to the subscriber loop 130 at loop interface 125. Those skilled in the art will appreciate that values for R1, R2, R3, and R4, as well as the adjustment range for $R_{ADJ}$, may be selected by conventional means to achieve efficient coupling of transmit and receive signals to and from subscriber loop 130 and to achieve effective echo cancellation. Those skilled in the art will further appreciate that various alternative configurations of line interface circuit 310, and in particular of hybrid circuit 400, may be used in DSL device 100 to provide echo cancellation.

In the embodiment pictured in FIG. 4, echo cancellation is performed by adjusting the value of compensation resistor $R_{ADJ}$. In some embodiments, the resistance of resistor $R_{ADJ}$ may be changed via programmable switches (not shown). In any case, the adjustment of the value of $R_{ADJ}$ in particular, and the adjustment of the echo cancellation performance of hybrid circuit 400 in general, is performed by processor circuit 340. In some embodiments, hybrid circuit 400 is "trained", based on successive measurements of the incoming and/or outgoing signals, to cancel all or part of the echo signals caused by mismatches between the subscriber loop impedance and the input impedance of DSL device 100.

Additional echo cancellation may be provided by digital processing in processor circuit 340, using well-known adaptive digital filtering techniques. In general, adaptive filter coefficients are adjusted to cancel remaining echoes after cancellation by the echo-cancelling hybrid circuit 400.

The settings used by control processor 340 to adjust and/or control hybrid processor 400, as well as the adaptive filter coefficients used in the digital filtering echo cancellation, are clearly related to the mismatch between the loop impedance and the hybrid input impedance. This information may be used to estimate the actual value of the loop impedance $Z_{LOOP}$. One approach to modeling the loop impedance is given by:

$$\hat{Z}_{LOOP} = Z_{INPUT} f(\text{hybrid\_settings}) + f(\text{echo\_coefficients}), \quad (3)$$

where $Z_{INPUT}$ represents the input impedance of DSL device 100 without echo cancelling adjustments, and the other terms represent correction factors corresponding to the echo cancellation settings for hybrid circuit 400 and to the filter coefficients for an echo-cancelling digital filter, respectively.

Those skilled in the art will appreciate that various models for estimating the loop impedance, using hybrid settings and/or filter coefficients, may be constructed. In some embodiments, a formula-based model may be developed based on the design characteristics of DSL device 100. In other embodiments, a model based on a look-up table stored in memory 360 may be employed. The look-up table may in some embodiments be constructed based on empirical measurements made with a representative DSL device 100 coupled to various test loops of various known impedances. Based on these measurements, a look-up table indexed by one or more of the hybrid settings or filter coefficients may be accessed by control processor 340 to obtain a current estimate of the unknown subscriber loop impedance observed in the field installation.

Figure 5:
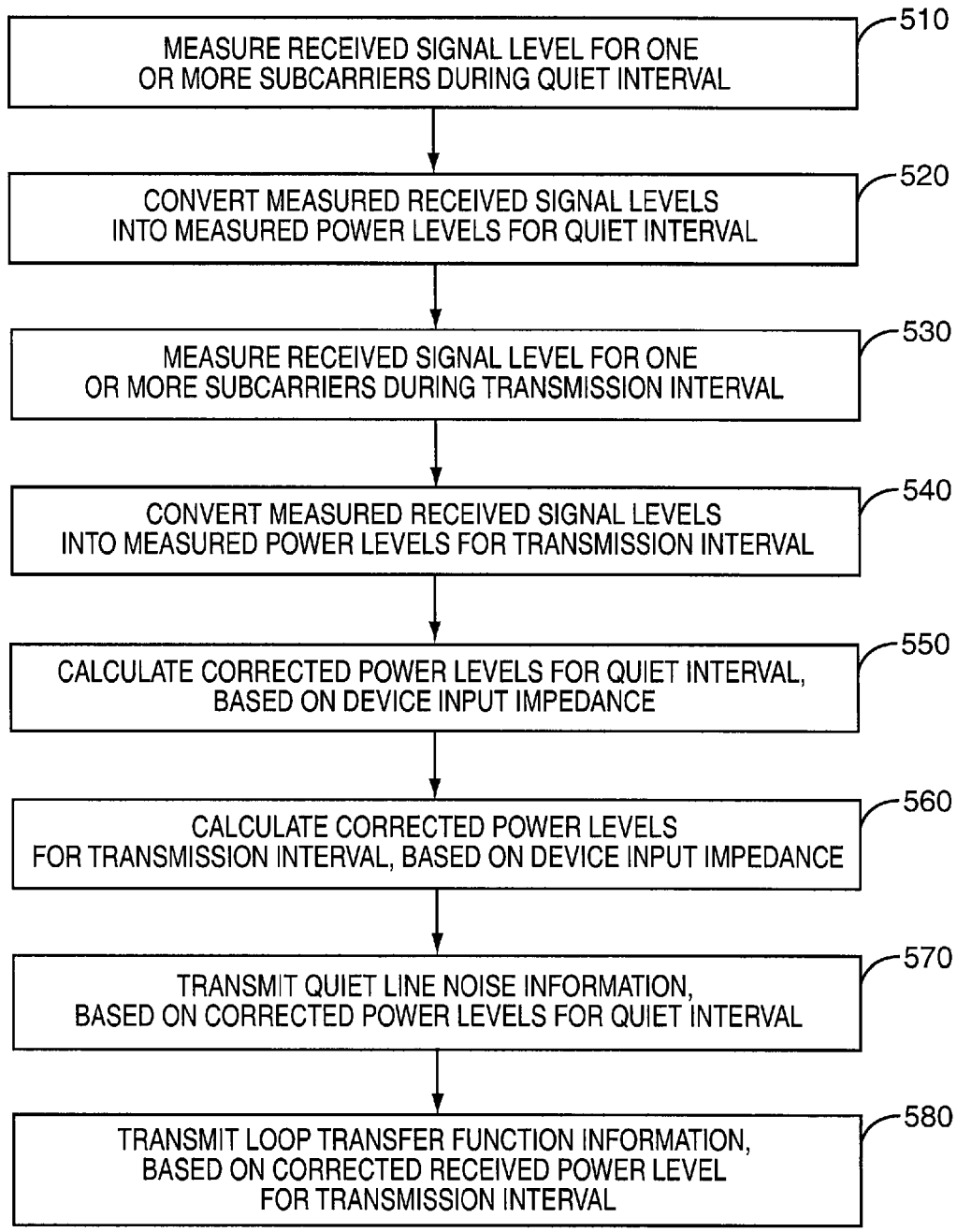
FIG. 5 is a flow diagram illustrating an exemplary method for calibrating received signal measurements in a DSL device.

FIG. 5 illustrates an exemplary method for calibrating received signal measurements in a digital subscriber line device and reporting quiet line noise information and loop transfer function information. The method of FIG. 5, and variants thereof, might be implemented using one or more of the various embodiments of DSL device 100 described above. Accordingly, the method of FIG. 5 will be described with reference to the DSL device 100 pictured in FIG. 3, although those skilled in the art will appreciate that the inventive methods described herein may be implemented on devices of varying types and configurations.

At block 510, DSL device 100 measures received signal level for one or more subcarriers during a quiet interval, i.e., an interval in which no signal is sent from the remote transceiver 120. Typically, this quiet interval forms part of a pre-determined initialization "handshake" between a CPE modem and a CO modem. In one or more embodiments, the measured received signal level for each subcarrier corresponds to (i.e. is proportional to) a voltage level for the subcarrier at the input to DSL device 100, at interface 125. In various embodiments, the received signal level is measured by measurement circuit 350, under the control of processor circuit 340, using an FFT algorithm to convert sampled time-domain data to frequency-selective data corresponding to the subcarriers of the DSL signal.

At block 520, a reference received power level for each of the one or more subcarriers is determined, i.e., the measured received signal levels are converted into measured power levels for the quiet interval. The resulting PSD is proportional to the quiet line noise observed at the DSL device 100. In some embodiments, the reference received power level is calculated by squaring the measured received signal levels and dividing by a value representing a reference input impedance: $P_{measured} = V^2_{measured}/Z_N$. In these embodiments, the measured power level is proportional to the actual received power. In others the squared measured value is divided by the actual input impedance (which may be a pre-determined value stored in memory), according to: $P_{measured} = V^2_{measured}/Z_{INPUT}$. In these embodiments, the measured power represents the actual received power level. In yet other embodiments, the measured signal levels are converted into measured power levels using an approximating formula, or by applying the measured signal level value to a look-up table to obtain a measured power level value. In any of these cases, however, the measured quiet line power levels will generally differ from the power levels that would be observed into a test load of known impedance $Z_N$.

At block 530 and 540, corresponding measurements and conversions are performed during transmission by the remote modem 120 of a test signal. Thus, at block 530, the received signal level is measured for each of one or more subcarriers during the transmission interval, and at block 540, the measured signal levels are converted into measured power levels for the transmission interval, using one or more of the approaches discussed above.

At block 550, the measured power levels are used to calculate corrected power levels, i.e., power levels normalized to a reference input impedance $Z_N$. In an exemplary embodiment, the formula of Equation (2) is used to convert measured power levels to normalized power levels. (Equation (2) applies directly when the measured power levels are calculated with respect to the actual input impedance value $Z_{INPUT}$. Those skilled in the art will appreciate that a scaling term may need to be inserted in Equation (2) in those embodiments where the measured power level is proportional, but not equal, to the actual received power.) In other embodiments, an approximate formula is used, while in others, a look-up table may be used. This look-up table may be formulated by pre-calculating normalized power levels for each of a range of quantized measured power levels, using a pre-determined device input impedance $Z_{INPUT}$ and the formula of Equation (2) or an approximation or equivalent thereof. In still other embodiments, the measured power levels may be corrected by applying a pre-determined scaling value to the measured power levels, wherein the scaling value effectively incorporates the nominal loop impedance value, the reference input impedance value, and the input impedance value. As with the loop-up table values discussed above, the scaling value may be pre-calculated based on the actual input impedance value. A single scaling value may be used for correcting all measured power levels, or frequency-dependent values may be used to correct individual subcarrier power levels or groups of subcarrier power levels. In each of these embodiments, however, the correction, whether by formula, by scaling, or by substitution via a look-up table, incorporates, either explicitly or implicitly, the reference input impedance value $Z_N$, to which the power levels are being normalized, a nominal loop impedance $Z_{REF}$, which approximates the actual loop impedance, and the actual input impedance $Z_{INPUT}$ of the DSL device 100.

At block 560, a similar procedure is carried out with respect to the measured power levels obtained from the received signal measurements taken during transmission of the test signal. Thus, corrected power levels for the transmission interval are calculated, based on the actual device input impedance $Z_{INPUT}$. The resulting power spectral density for the power received during the transmission interval is thereby normalized to a reference load impedance $Z_N$, facilitating more consistent reporting from one device type to another.

At block 570, quiet line noise information is transmitted to the remote transceiver unit 120. This quiet line noise information is based on the corrected power levels corresponding to the quiet interval. In an exemplary embodiment, the corrected power levels are converted to a format prescribed by a DSL standard, such as VDSL2 or ADSL2 before transmission. In some embodiments, the corrected power levels may be converted to a logarithmic representation of the quiet line power spectral density before being transmitted to the remote transceiver unit 120.

Similarly, at block 580, loop transfer function information, based on the corrected power levels corresponding to the test transmission interval, is transmitted to the remote transceiver unit 120. The loop transfer function information is typically calculated from transmission power information corresponding to the test transmission. This transmission power information may be sent by the remote transceiver 120 and received at DSL device 110, or may be known to (i.e. stored in memory at) the DSL device 110. Thus, the loop transfer function information may be calculated by converting the corrected power levels into logarithmic form and subtracting from a logarithmic representation of the transmitted power level, such as according to:

$$HLOG_{ps\_dB}(i) = PSD_{TX\_dB}(i) - PSD_{REF\_dB}(i), \qquad (4)$$

where $HLOG_{ps\_dB}(i)$ represents the loop transfer function information per subcarrier $PSD_{TX\_dB}(i)$ is the information characterizing the transmitted power levels at the remote modem 120, and $PSD_{REF\_dB}(i)$ are the corrected power levels, per subcarrier i, in logarithmic form. In some embodiments, loop transfer function information calculated according to Equation (4) or an equivalent or approximation thereof is scaled and/or formatted in compliance with a DSL standard specification before transmission to the remote transceiver 120. Those skilled in the art will appreciate that in some embodiments the loop transfer function information may simply comprise the corrected power level information itself (or a scaled and/or formatted version thereof), in which case a calculation equivalent to Equation (4) may be calculated at the remote modem 120.

In the method illustrated in FIG. 5, power levels are calculated with respect to a nominal loop impedance $Z_{REF}$. As explained above, $Z_{REF}$ may typically be selected to approximate the expected loop impedance. For example, since the loop impedance may be expected to generally vary with a real part between 100 and 120 ohms and an imaginary part of 0 to −20 ohms, $Z_{REF}$ may be selected in an exemplary embodiment to be 100-j10 ohms. However, actual loop impedances in the field may vary over a broader range. Thus, it may be desirable to correct, i.e., calibrate, measured power spectral densities (and the corresponding quiet line noise information and loop transfer function information) for the actual loop impedance observed by the DSL device 100.

An estimate of the loop impedance, such as was described above with reference to the echo cancelling circuits of FIGS. 3 and 4, may be used for this purpose. Given an estimate of the loop impedance $\hat{Z}_{LOOP}$, a corrected power spectral density may be calculated according to:

$$PSD_{Corrected} = PSD_{DUT} \cdot \frac{Z_N}{Z_{INPUT}} \frac{|\hat{Z}_{LOOP} + Z_{INPUT}|^2}{|\hat{Z}_{LOOP} + Z_N|^2}, \quad (5)$$

where $PSD_{DUT}$ is the measured power spectral density, $Z_N$ is a reference load impedance value to which measurements are to be normalized, and $Z_{INPUT}$ is the input impedance of the DSL device 100.

Figure 6:
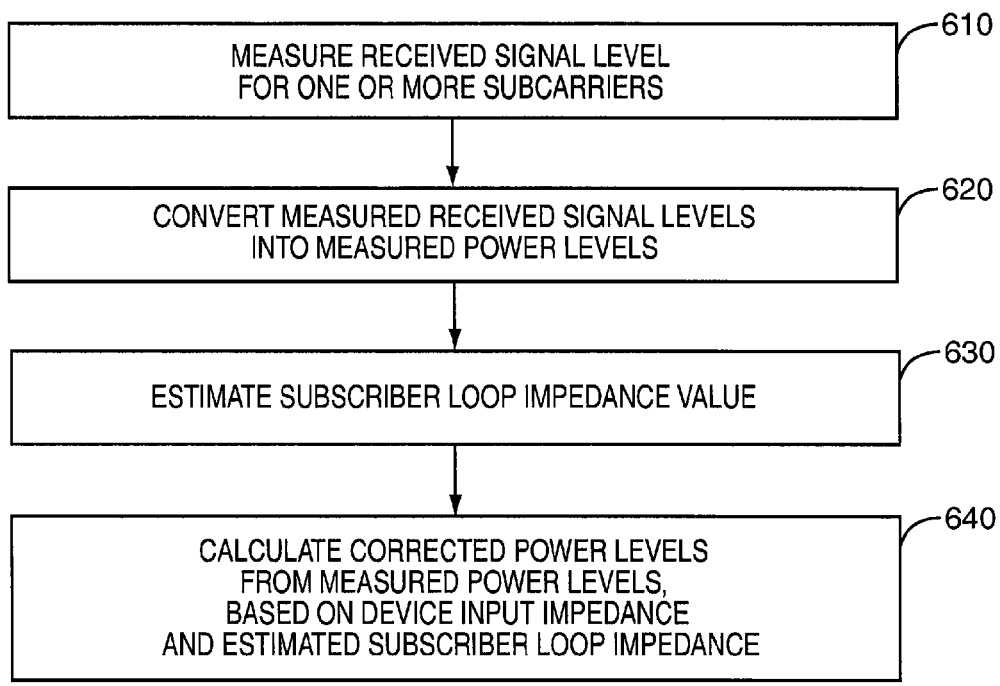
FIG. 6 is a flow diagram illustrating another exemplary method for calibrating received signal measurements in a DSL device.

Thus, another method for calibrating received signal measurements in a digital subscriber line device is shown in FIG. 6. At block 610, received signal levels for one or more subcarriers are measured. Depending on whether quiet line noise information or loop transfer function information is sought, these measurements may be taken during a quiet interval or during transmission of a test signal by the remote modem 120.

At block 620, the measured received signal levels are converted into measured power levels according to any of the techniques described above with respect to blocks 520 and 540 of FIG. 5. At block 630, the subscriber loop impedance value is estimated. As was discussed earlier with respect to FIGS. 3 and 4, the loop impedance may be estimated by observing its effect on the adaptive echo cancellation circuit or circuits of the DSL device 100. These echo cancellation circuits may include an adjustable echo-cancelling hybrid circuit, in which case the loop impedance may be estimated based on the settings derived for the hybrid circuit. The estimate may be calculated from an empirically derived formula, using the hybrid circuit settings as an input, or may be retrieved from a look-up table indexed by the hybrid settings.

In some embodiments, the echo cancelling circuits may include an adaptive echo-cancelling digital filter, in which case the loop impedance may be estimated based on the filter coefficients determined for the digital filter, again using an empirically derived formula or a look-up table. In yet other embodiments, the loop filter estimate may be obtained based on both hybrid circuit settings as well as adaptive digital filter coefficients.

In any event, corrected power levels are calculated at block 640 from the measured power levels, based on the device input impedance $Z_{INPUT}$ and the estimated loop impedance $\hat{Z}_{LOOP}$. The corrected power levels may be calculated according to Equation (5), or an equivalent or approximation thereof, or may be retrieved from a loop-up table comprising pre-calculated values. In either case, those skilled in the art will appreciate that the corrected power levels are normalized to the reference load impedance value $Z_N$, and are corrected to account for the actual device input impedance $Z_{INPUT}$ as well as an estimate of the line impedance $Z_{LOOP}$.

Those skilled in the art will further appreciate that the methods illustrated in FIGS. 5 and 6, as well as variants and equivalents thereof, may be implemented using a DSL device 100 such as is picture in FIG. 3. It will be further understood that each block of the flowchart and/or block diagram illustrations, and combinations of blocks in the flowchart and/or block diagram illustrations, may be implemented by computer program instructions and/or hardware operations. These computer program instructions may be provided to a processor, such as processor circuit 340, of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory, such as memory 360, that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of calibrating received signal measurements in a first communication device, the method comprising: measuring a received signal level for each of one or more subcarriers of a transmitted signal received from a second communication device; converting the measured received signal level for each of the one or more subcarriers into a corresponding measured power level; estimating a terminal-to-terminal impedance between the first and second communication devices; and calculating a corrected power level for each of the one or more subcarriers as a function of the measured power level for the subcarrier, a known reference input impedance for the first communication device and the estimated terminal-to-terminal impedance.

2. The method of claim 1, wherein the terminal-to-terminal impedance is estimated as a function of a mismatch between the terminal-to-terminal impedance and an input impedance of the first communication device.

3. The method of claim 2, wherein the terminal-to-terminal impedance is estimated based on the input impedance of the first communication device and one or more correction factors.

4. The method of claim 3, wherein one of the one or more correction factors corresponds to echo cancelling settings of a hybrid circuit included in the first communication device.

5. The method of claim 3, wherein one of the one or more correction factors corresponds to coefficients of a filter included in the first communication device.

6. The method of claim 3, wherein the one or more correction factors are retrieved from a look-up table stored in memory included in the first communication device.

7. The method of claim 1, wherein the measured received signal level for each of the one or more subcarriers is converted into a corresponding measured power level as a function of the known reference input impedance.

8. The method of claim 1, wherein the measured received signal levels represent actual received power levels.

9. The method of claim 1, wherein the corrected power levels are calculated by normalizing the measured power levels to the known reference input impedance.

10. The method of claim 9, wherein the measured power levels are normalized to the known reference input impedance level based on the estimated terminal-to-terminal impedance and one or more scaling factors.

11. The method of claim 9, wherein the measured power levels are normalized to the known reference input impedance level using a look-up table formulated with pre-calculated normalized power levels for each of a range of quantized measured power levels.

12. The method of claim 1, wherein the estimated terminal-to-terminal impedance represents a nominal loop impedance between the first communication devices.

13. A first communication device comprising one or more circuits operable to: measure a received signal level for each of one or more subcarriers of a transmitted signal generated by a second communication device; convert the measured received signal level for each of the one or more subcarriers into a corresponding measured power level; estimate a terminal-to-terminal impedance between the first and second communication devices; and calculate a corrected power level for each of the one or more subcarriers as a function of the measured power level, a known reference input impedance for the first communication device and the estimated terminal-to-terminal impedance.

14. The first communication device of claim 13, wherein the one or more circuits are operable to estimate the terminal-to-terminal impedance as a function of a mismatch between the terminal-to-terminal impedance and an input impedance of the first communication device.

15. The first communication device of claim 14, wherein the one or more circuits are operable to estimate the terminal-to-terminal impedance based on the input impedance of the first communication device and one or more correction factors.

16. The first communication device of claim 13, wherein the one or more circuits are operable to convert the measured received signal level for each of the one or more subcarriers into a corresponding measured power level as a function of the known reference input impedance.

17. The first communication device of claim 13, wherein the measured received signal levels represent actual received power levels.

18. The first communication device of claim 13, wherein the one or more circuits are operable to calculate the corrected power levels by normalizing the measured power levels to the known reference input impedance.

19. The first communication device of claim 18, wherein the one or more circuits are operable to normalize the measured power levels to the known reference input impedance level based on the estimated terminal-to-terminal impedance and one or more scaling factors.

20. The first communication device of claim 19, wherein the one or more circuits are operable to normalize the measured power levels to the known reference input impedance level using a look-up table formulated with pre-calculated normalized power levels for each of a range of quantized measured power levels.

21. A first Digital Subscriber Line (DSL) communication device comprising one or more circuits operable to: measure a received signal level for each of one or more subcarriers of a transmitted DSL signal generated by a second DSL communication device; convert the measured received signal level for each of the one or more subcarriers into a corresponding measured power level; estimate a loop impedance between the first and second DSL communication devices; and calculate a corrected power level for each of the one or more subcarriers as a function of the measured power level, a known reference input impedance for the first DSL communication device and the estimated loop impedance.

* * * * *